United States Patent
Gollamudi

(10) Patent No.: US 7,801,087 B2
(45) Date of Patent: Sep. 21, 2010

(54) METHOD OF TRANSMITTING CONTROL SIGNALS IN A DIGITAL COMMUNICATIONS SYSTEM

(75) Inventor: Sridhar Gollamudi, Morris Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 589 days.

(21) Appl. No.: 11/413,763

(22) Filed: Apr. 27, 2006

(65) Prior Publication Data

US 2007/0253374 A1    Nov. 1, 2007

(51) Int. Cl.
*H04B 7/216* (2006.01)
*H04B 1/00* (2006.01)

(52) U.S. Cl. .............. 370/335; 370/342; 370/441; 375/141; 375/147

(58) Field of Classification Search ......... 370/308–350, 370/431–441; 375/140, 141, 146, 147
See application file for complete search history.

(56) References Cited

U.S. PATENT DOCUMENTS

| | | | | |
|---|---|---|---|---|
| 5,910,948 | A * | 6/1999 | Shou et al. | 370/335 |
| RE39,954 | E * | 12/2007 | Asano et al. | 375/141 |
| 2003/0147371 | A1* | 8/2003 | Choi et al. | 370/341 |
| 2003/0147454 | A1* | 8/2003 | Kwon et al. | 375/146 |
| 2004/0067757 | A1* | 4/2004 | Fukui | 455/453 |
| 2005/0181802 | A1* | 8/2005 | Utakouji | 455/453 |
| 2006/0165028 | A1* | 7/2006 | Hiraki et al. | 370/328 |
| 2006/0209870 | A1* | 9/2006 | Lee et al. | 370/432 |
| 2006/0245398 | A1* | 11/2006 | Li et al. | 370/335 |

* cited by examiner

*Primary Examiner*—Alpus H Hsu
*Assistant Examiner*—Jeremy Costin
(74) *Attorney, Agent, or Firm*—Harness, Dickey & Pierce, P.L.C.

(57) ABSTRACT

A method is provided by which an information-bearing message may be inferred by the receiver on the basis of which one of the M communication channels was used for transmission.

7 Claims, 1 Drawing Sheet

METHOD OF TRANSMITTING CONTROL SIGNALS IN A DIGITAL COMMUNICATIONS SYSTEM

FIELD OF THE INVENTION

This invention relates to digital communication systems which use special channels for the communication of control information.

ART BACKGROUND

Broadly speaking, the developments to be described below relate to communications systems in which a transmitter may, at a given time, use any of a set of independent parallel communication channels to transmit messages to a particular receiver. A schematic view of such a communication system is shown in FIG. 1, including transmitter 10, channels 21, 22, and 23, and receiver 30.

A typical example of such a system is a shared packet data communication system in which the transmitter communicates simultaneously with several receivers using a set of N communications channels that are shared among the different receivers. Parallel channels are used in such a system to enable the transmitter to transmit to more than one receiver at any time instant. Each receiver is pre-configured to be able to receive signals from only M out of the N shared channels. The set of M channels that a receiver monitors is pre-defined, and may be different for different receivers. The transmitter schedules up to N users at a time and transmits messages to each of them via a different channel chosen from the N available channels.

For instance, suppose that the transmitter communicates with 20 different receivers, and has access to N=4 parallel shared channels. Suppose also that each receiver is pre-configured to listen to one of M=2 channels, where the specific set of 2 channels from among the 4 channels that a particular receiver monitors is also pre-defined. Then, during any transmission time, the transmitter may choose to transmit information to a set of K receivers of its choice from among the 20 available receivers, where K≦4. The transmitter would use K communication channels for these transmissions, one for each receiver, such that the channel used for each user belongs to the set of channels that that user monitors.

HSDPA is a high-speed packet data transmission system for the downlink, i.e., the link from the base station to the mobile station, in a wireless communication system. The current implementation of HSDPA is defined in Release 5 of the UMTS specification published by the $3^{rd}$ Generation Partnership Project (3GPP).

In HSDPA, a group of users is scheduled in each transmission time interval (TTI), which is 2 ms long. In other words, within the 2-ms duration of a single TTI, a scheduler in the base station selects a small number (typically 0 to 8) of users to which data is transmitted in that 2-ms interval. Data is transmitted to each of the scheduled users via a physical channel called the HS-PDSCH, and the corresponding control information is transmitted to each scheduled user on a shared control channel called the HS-SCCH.

HS-SCCH transmissions to the scheduled users in a TTI is an example of the shared channel communication system described above. The base station transmitter has a set of N HS-SCCH channels available, and each user is capable of monitoring up to M=4 HS-SCCH channels. If K users are scheduled in a TTI, then the base station must transmit HS-SCCH information to each of the K scheduled users using a different HS-SCCH channel, such that the HS-SCCH channel used for each user belongs to the set of channels monitored by the user.

The HS-SCCH carries several parameters that are required by the user to decode the corresponding HS-PDSCH transmission. These may include, e.g., parameters that identify the set of codes over which HS-PDSCH signals are transmitted for that user. HS-PDSCH codes are OVSF spreading codes at spreading factor 16, of which there are a total of 16 codes. A subset of these 16 codes are available for use by HS-PDSCH at the base station. According to the current specification of the HS-SCCH channel, it carries information that determines exactly the set of one or more spreading codes from among the available HS-PDSCH codes over which data is transmitted to the scheduled user.

SUMMARY OF THE INVENTION

We have found a method by which an information-bearing message may be inferred by the receiver on the basis of which one of the M communication channels was used for transmission. For example, suppose that a receiver monitors four communication channels (M=4) for a possible transmission of a signal to this receiver, and suppose that the communication channel carries 10 bits of information for the receiver. Then, in addition to the 10 bits that are transmitted on the channel itself, the transmitter may convey two more bits of information to the receiver just by selecting the communication channel corresponding to the 2-bit message to be conveyed. In general, if there are M parallel communication channels, one of which is chosen for transmission in any instant, then the transmitter can convey $\log_2 M$ bits of information in addition to the information that is carried on the communication channel itself.

DETAILED DESCRIPTION

Consider a kind of communications system described in the Section 'System Under Consideration,' of which the system of HS-SCCH transmission in HSDPA is a special case. The idea of the invention is to be able to transmit extra information of up to $\log_2 M$ bits to the receiver in addition to the information that is already carried by the communication channel, without modifying the communication channels. This is done using the fact that selection of a particular channel for transmission from among the M available channels conveys $\log_2 M$ bits of information.

In the case of HS-SCCH transmissions, each user monitors M HS-SCCH channels, and a scheduled user receives an HS-SCCH transmission from one of these M channels. The transmitter can transmit an additional $\log_2 M$ bits of information to the scheduled user by choosing the HS-SCCH channel for this user from among the M possibilities depending on the additional message that needs to be conveyed.

For example, if M=2, the base station transmitter may transmit an additional $\log_2 M=1$ bit of information to the scheduled user via selection of the appropriate HS-SCCH code. Suppose that the user is pre-configured to monitor HS-SCCH channel numbers 3 and 5. Then a scheme for transmission of an additional bit of information is to use HS-SCCH channel number 3 if the additional bit is '0' and channel number 5 if the additional bit is '1'.

Similarly, if each user is configured to monitor M=4 HS-SCCH channels, then the base station may convey an additional $\log_2$ M=2 bits of information without increasing the information carried on the HS-SCCH. Alternatively, 2 bits of information that are otherwise carried on the HS-SCCH may be conveyed in this manner so that the payload carried by the HS-SCCH is reduced.

Figure 1:
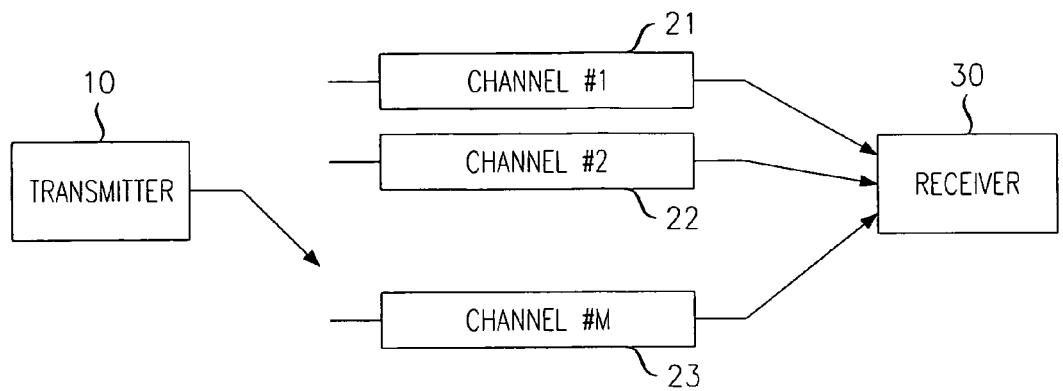
FIG. 1 is a schematic view of a communication system in which multiple independent channels are available between the transmitter and the receiver.
Figure 2:
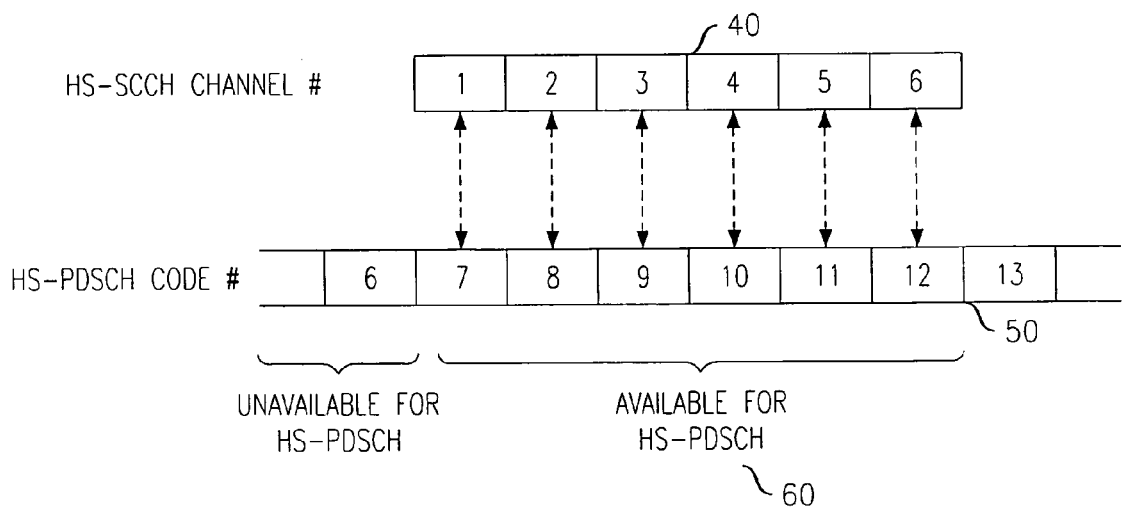
FIG. 2 is a diagram illustrating a correlation between channels and codes in an HSDPA system according to the invention in one embodiment.

The ability to convey additional amount of information in this manner is very useful in a system where a restriction is imposed on a user to not use more than one HS-PDSCH code per TTI. Such a restriction may be imposed when it is known a priori that the user's data rate is small enough to be carried using only one HS-PDSCH code per TTI, such as in a Voice over IP (VoIP) application. In this scenario, we may eliminate transmission of HS-PDSCH code information from the HS-SCCH by defining a fixed relation between an HS-SCCH channel and a corresponding HS-PDSCH code number. By establishing such a relation, the user will know the HS-PDSCH code to use simply by looking at which one of the M HS-SCCH codes was used for transmission. Such a relation is illustrated in FIG. 2, where the channels are denoted by reference numeral 40, and the codes by reference numeral 50.

As an example, suppose that N=6 HS-SCCH channels are available at the base station, and that each user is configured to monitor up to M=4 of them. Suppose also that there is a restriction that each user may not use more than one HS-PDSCH code in a TTI. This implies that at most N=6 HS-PDSCH codes may be used in a TTI, one for each scheduled user. In FIG. 2, codes 60 are indicated as being available for HS-PDSCH.

Suppose that OVSF code numbers {7, 8, 9, 10, 11, 12} are available for HS-PDSCH transmissions. We can then establish a fixed mapping between the HS-SCCH channel numbers and the HS-PDSCH code numbers as shown in FIG. 2. Using this mapping, if a user is scheduled and is transmitted to using HS-SCCH channel number 3, then the user will automatically understand that the corresponding data transmission for him will use HS-PDSCH code number 9, without the HS-SCCH having to explicitly transmit that information to the user.

Using this scheme transmission of HS-PDSCH code information can be removed from HS-SCCH transmissions, thereby reducing its transmit power requirements.

What is claimed is:

1. A method, comprising:
  determining, at a receiver, which of a plurality of High-Speed Shared Control Channel (HS-SCCH) communication channels was used for transmitting a message to the receiver, at least the determined channel having a corresponding HS-SCCH channel number;
  determining a High-Speed Physical Downlink Shared Channel (HS-PDSCH) code of a plurality of HS-PDSCH codes for decoding a further message, the determining achieved by mapping the corresponding HS-SCCH channel number to the HS-PDSCH code using a map that maps each of a plurality of HS-SCCH channel numbers to one of the plurality of HS-PDSCH codes, the HS-PDSCH code used for data transmission being determined from a pre-defined mapping from HS-SCCH channel numbers to corresponding HS-PDSCH codes: and
  decoding the further message using the determined HS-PDSCH code.

2. The method of claim 1, wherein the pre-defined mapping maps two or more HS-SCCH channel numbers to one of the plurality of HS-PDSCH codes.

3. The method of claim 2, wherein the plurality of HS-PDSCH codes are spreading codes.

4. The method of claim 1, wherein there are a plurality of further messages, and each of the HS-SCCH communication channels have a one-to-one correspondence to one of the plurality of further messages, and each of the plurality of further messages is unique with respect to other further messages.

5. The method of claim 1, wherein at least two of the plurality of HS-SCCH communication channels correspond to the further message.

6. The method of claim 1, wherein the map for decoding the further message maps each of the plurality of HS-SCCH channel numbers to a different HS-PDSCH code.

7. The method of claim 6, wherein the map with the different HS-PDSCH codes is at the receiver.

\* \* \* \* \*